Figure 1:
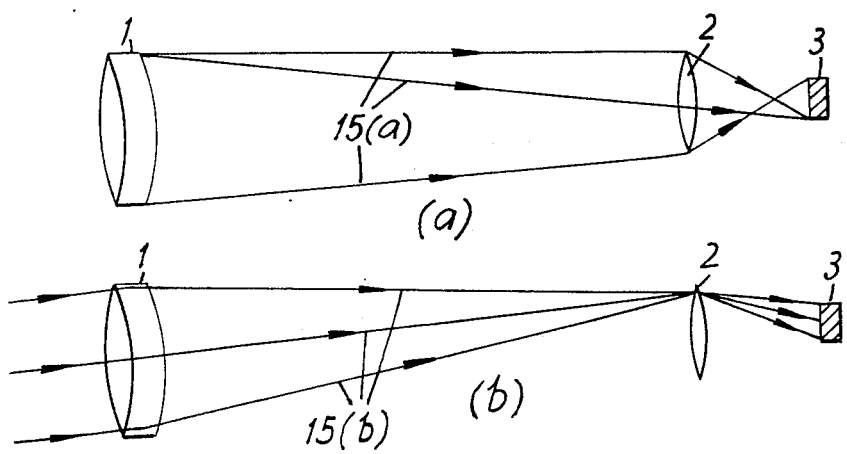

United States Patent [19]
Barron

[11] 3,977,628
[45] Aug. 31, 1976

[54] TRACKING AND/OR GUIDANCE SYSTEMS
[75] Inventor: Donald Robert Barron, Sunbury-on-Thames, England
[73] Assignee: EMI Limited, Hayes, England
[22] Filed: Nov. 21, 1974
[21] Appl. No.: 526,044

[30] Foreign Application Priority Data
Nov. 23, 1973 United Kingdom............... 54509/73

[52] U.S. Cl............................ 244/3.16; 250/203 R; 356/4; 356/152
[51] Int. Cl.² ......................................... F41G 7/00
[58] Field of Search............. 356/4, 152; 250/203 R; 244/3.16, 3.13

[56] References Cited
UNITED STATES PATENTS

| | | | |
|---|---|---|---|
| 3,218,909 | 11/1965 | Fain ....................................... | 356/4 |
| 3,296,443 | 1/1967 | Argyle.............................. | 250/203 R |
| 3,497,695 | 2/1970 | Smith............................... | 250/203 R |
| 3,638,025 | 1/1972 | Dishington....................... | 250/203 R |

Primary Examiner—Maynard R. Wilbur
Assistant Examiner—S. C. Buczinski
Attorney, Agent, or Firm—Fleit & Jacobson

[57] ABSTRACT

A tracking and/or guidance system is disclosed for defining a route to be followed by a vehicle or projectile to a target. The system includes a tracking device which is arranged firstly to operate in an acquisition mode, applicable when the vehicle or projectile is close to the device, and subsequently to be progressively converted into a tracking mode as the distance between the vehicle or projectile and the device increases. In the acquisition mode, the device has a wide field of view but is relatively insensitive to deviations of said vehicle or projectile from said route. As the aforesaid distance increases, however, the field of view is progressively reduced and the sensitivity to said deviations is progressively increased. The invention thus provides a system which is suitable for the both initial acquisition and long range guidance of a vehicle or projectile aimed towards a distant target whilst using a conveniently small detector arrangement.

7 Claims, 4 Drawing Figures

TRACKING AND/OR GUIDANCE SYSTEMS

The present invention relates to tracking and/or guidance systems and it relates more especially to such systems as employ static detector arrangements which are sensitive to radiation emitted by or reflected from a vehicle or a projectile such as a guided missile.

The tracking and guidance of a guided missile such as an anti-tank missile is associated with some difficulty because, in order that the system may have a wide field of view (which is necessary to allow for deviations of the missile from its desired course when the missile is close to the system) the detector material may be required to occupy a substantial area. Large area detectors tend to exhibit unacceptably large bulk leakage currents which degrades signal-to-noise performance.

Another difficulty arises in that it is difficult to initially acquire the missile onto the detector, even allowing for the larger image, since in many applications the missile is released some distance from the tracker and its trajectory cuts across the line of sight of the tracker. This difficulty can be overcome by using a second tracker to initially acquire the missile but this is undesirably expensive.

It is an object of the present invention to provide a guidance and/or tracking system which alleviates the above mentioned difficulties.

According to one aspect of the invention there is provided a tracking and/or guidance system for defining a course to be followed by a vehicle or projectile aimed towards a target, including a tracking device having an aquisition mode, applicable when the vehicle or projectile is relatively close to the device and in which mode the device exhibits a relatively wide field of view but a relatively low discrimination with regard to deviations of said vehicle or projectile from said course, and means for progressively converting said device from operation in said acquisition mode to operation in a tracking mode, in which it exhibits a relatively narrow field of view but a relatively high discrimination with regard to said deviations, as the distance between the vehicle or projectile and the device increases, the said device comprising:

a. objective lens means adapted to receive radiant energy from said vehicle or projectile,
b. field lens means arranged to receive radiant energy from said objective lens means and being disposed in the focal plane thereof,
c. detecting means having a surface sensitive to said radiant energy and adapted to receive radiant energy from said field lens means, the detecting means being arranged to produce electrical output signals indicative of said deviations, and
d. drive means operative on said detecting means and effective
  i. in said acquisition mode to space said detecting means from said field lens means by a predetermined distance so that said radiant energy received by said surface is diffused over a substantial part of said surface, and
  ii. in response to, and concomitantly with, increasing distance of said vehicle or projectile from said device to progressively reduce the spacing between said detecting means and said field lens means so that said radiant energy is focused with increasing sharpness on said surface as the distance between the vehicle or projectile and said device increases.

Figure 3:
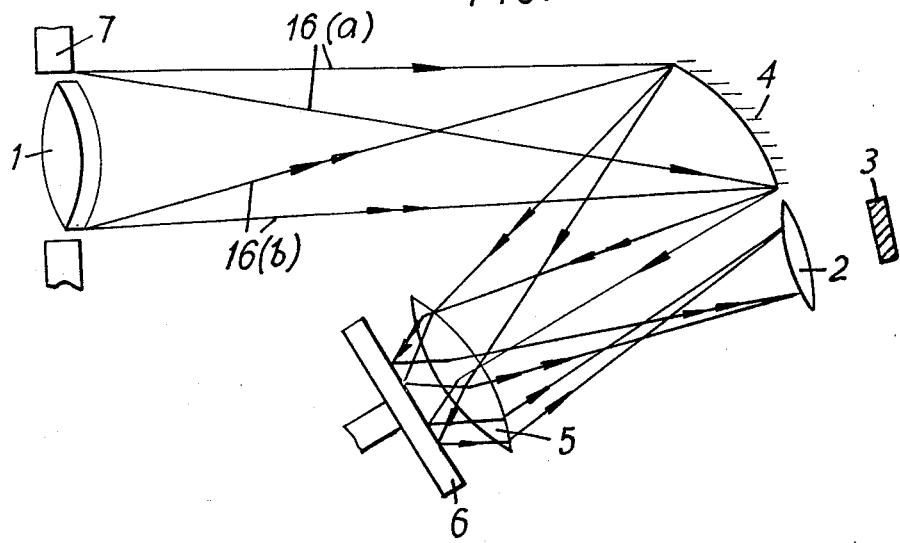
Figure 2:
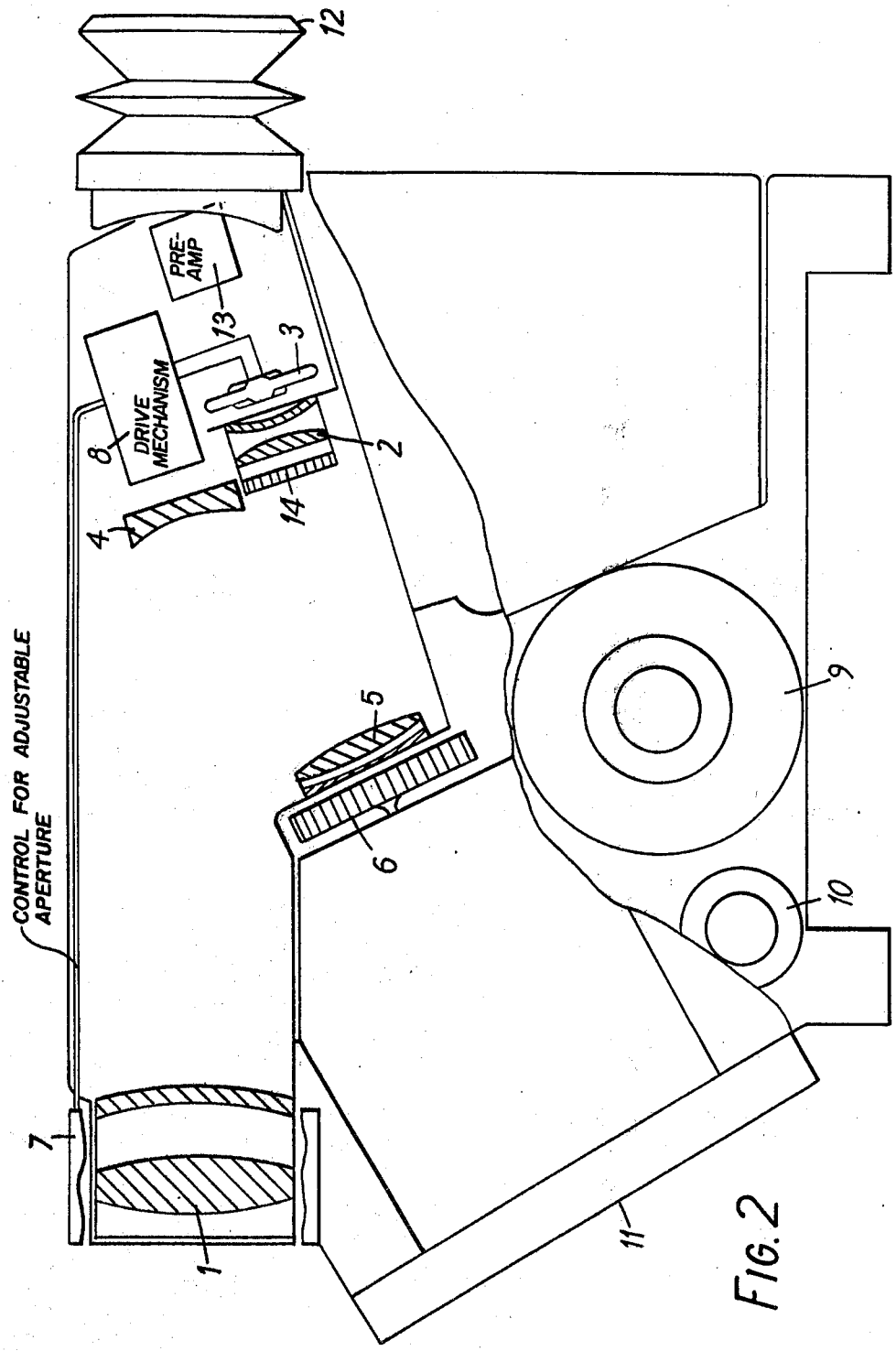

In order that the invention may be clearly understood and readily carried into effect, examples thereof will now be described with reference to the accompanying drawings of which:

FIGS. 1(a) and (b) show, in simplified side elevational view, an optical arrangement of a system in accordance with one embodiment of the system, FIG. 2 shows in cross-section part of a system in accordance with a practical embodiment of the system, and FIG. 3 shows in simplified side elevational view the optical arrangement of the embodiment of the invention shown in FIG. 2.

Referring now to FIGS. 1(a) and 1(b) in which the numerals 1, 2 and 3 refer respectively to an objective lens, a field lens and a four-quadrant static split detecting arrangement of known kind. The field lens 2, is placed at the focal plane of objective lens 1, and is such as to focus an image of the objective lens onto the face of the detecting arrangement 3. This is represented in FIG. 1(a) where lines 15(a) represent rays of light from the perimeter of the objective lens 1 being imaged by the field lens 2 in the usual manner of such diagrams.

Referring now to FIG. 1(b) lines 15(b) represent radiation incident on the objective lens from a missile which is effectively at an infinite distance from the objective lens. As is well known, the axis of the system comprising the components 1, 2 and 3 is directed at a target to which the missile is required to travel. The missile is launched from a point to one side of the system and carries an infra-red emitting beacon. When the missile enters the field of view of the system, the arrangement 3 provides — in known manner — error signals indicative of departures of the missile from the correct course to take it to the target. Since the detector is situated such that it initially receives the image of the objective lens, then any radiation incident on the objective is diffused over the whole surface of the detector as is shown in FIG. 1(b). This in effect gives a wide field of view, limited only by the finite size of the field lens and its capability of directing input rays to the image position. When such error signals are provided, they are sent to the missile either by means of a radio link or an electrical cable connection and used to actuate control members to correct the course of the missile.

Clearly there is a requirement for a large field of view when the missile is still close to the system. The field of view can, however, be reduced when the distance between the missile and the system increases. In the present example of the arrangement this is achieved by providing means (not shown) for moving the arrangement 3 along the axis of the system. The beacon image is never completely in focus since this would require it to be placed at the focal plane of the objective lens and this is occupied by the field lens, as described. It has been found in practice, however, that the degree of focusing produced by this arrangement is sufficient to detect angular deviations of the order of $10^{-4}$ radians.

As the missile approaches the target and accurate placing of the target becomes more important, the arrangement 3 is moved towards the lens 2 and the size of the patch of energy directed onto the arrangement 3 reduces, so narrowing the field of view but rendering the arrangement 3 more sensitive to variations in the course of the missile. In order to minimise the effects of non-uniform pupil illumination a diffusing screen, such as a fibre optic plate, is placed between the objective lens 1 and field lens 2 close to the field lens.

FIG. 2 shows a practical embodiment of the invention. Components common to FIG. 1 are identified by common reference numerals. The optical arrangement is shown in simplified form in FIG. 3 to which reference will now be made. Radiation, as before, is incident on an objective lens 1, in this case modified by an adjustable aperture 7. A concave mirror 4, having a curvature equal to two-thirds of the focal length of said objective lens is situated substantially along the focal plane of the objective lens but angled so as to direct rays toward a second lens 5, situated off axis at a distance equal to half the focal length of the objective lens 1 from the mirror 4, the reasons for which will shortly be described. A plane mirror 6 is situated behind and parallel to the lens 5 so as to re-direct rays through said lens 5 to the field lens 2 and then onto the detector 3. The mirror 4 serves to focus an image of aperture 7 at the principal plane of lens 5. Lines 16(a) and 16(b) represent rays from the top and the bottom of the aperture respectively. Rays forming the image of said aperture emerge from lens 5 in a parallel beam, having been collimated by the lens. This collimated beam is then reflected from the mirror 6 back through the lens 5. The rays transmitted by lens 5 are focused by the field lens 2 onto the detector 3 in a similar manner to that described in relation to FIGS. 1(a) and 1(b). Similarly radiation falling on the objective lens 1 is diffused over the entire surface of the detector arrangement 3. Referring back to FIG. 2, mirror 6 is a spatially stabilized mirror with associated mirror drive 11. The mirror 6, is of a known kind and is arranged to compensate for high frequency vibration, such as that owing to manual operation, and also for the compensation of bias error if the tracking system works imperfectly. This is controlled by the 'trim-stick' 9. Also incorporated into the system is a firing button 10, for initially firing the missile. A drive mechanism 8 provides the drive for the detector arrangement 3. One form of drive mechanism is a clockwork arrangement wound before each firing, at the same time returning the detector to its original position, and activated upon firing a missile. A diffusing screen 14, serves the same purpose as hereinbefore described and a preamplifier arrangement 13 serves to initially amplify signals obtained from the detecting arrangement 13. A sight 12, is provided which can be adapted for day and night time usage, the night-sight including an image intensifier arrangement.

What I claim is:

1. A tracking and/or guidance system for defining a course to be followed by a vehicle or projectile aimed towards a target, including a tracking device having an acquisition mode, applicable when the vehicle or projectile is relatively close to the device and in which mode the device exhibits a relatively wide field of view but a relatively low discrimination with regard to deviations of said vehicle or projectile from said course, and means for progressively converting said device from operation in said acquistion made to operation in a tracking mode, in which it exhibits a relatively narrow field of view but a relatively high discrimination with regard to said deviations, as the distance between the vehicle or projectile and the device increases, the said device comprising:
   a. objective lens means adapted to receive radiant energy, from said vehicle or projectile,
   b. field lens means arranged to receive radiant energy from said objective lens means and being disposed in the focal plane thereof,
   c. detecting means having a surface sensitive to said radiant energy and adapted to receive radiant energy from said field lens means, the detecting means being arranged to produce electrical output signals indicative of said deviations, and
   d. drive means operative on said detecting means and effective
      i. in said acquisition mode to space said detecting means from said field lens means by a predetermined distance so that said radiant energy received by said surface is diffused over a substantial part of said surface, and
      ii. in response to, and concomitently with, increasing distance of said vehicle or projectile from said device to progressively reduce the spacing between said detecting means and said field lens means so that said radiant energy is focused with increasing sharpness on said surface as the distance between the vehicle or projectile and said device increases.

2. A system according to claim 1 wherein said device further includes the following elements disposed between said objective lens means and said field lens means:
   a. a concave mirror having a radius of curvature substantially equal to two-thirds of the focal length of said objective lens means and angled with respect to the optic axis thereof,
   b. a further lens disposed to receive radiant energy reflected from said concave mirror and being spaced therefrom by a distance substantially equal to one half of the focal length of said objective lens means, and
   c. a plane mirror located behind and parallel with said further lens and arranged to reflect said radiant energy back through said further lens and toward said field lens means.

3. A system according to claim 1 including means for utilising said electrical signals to modify the course of said vehicle or projectile.

4. A system according to claim 2 wherein said plane mirror comprises image stability mirror means arranged to reduce the effects of vibration on the system.

5. A system according to claim 2 including a diffusing means located in front of said field lens.

6. A system according to claim 5 wherein said diffusing means comprises a fibre optic plate.

7. A system according to claim 2 including aperture means, for limiting the aperture of said objective lens means, which comprises an iris the diameter of which is arranged to decrease during the time period through which the spacing between said detecting means and said field lens means is progressively reduced.

* * * * *